United States Patent Office 3,047,965
Patented Aug. 7, 1962

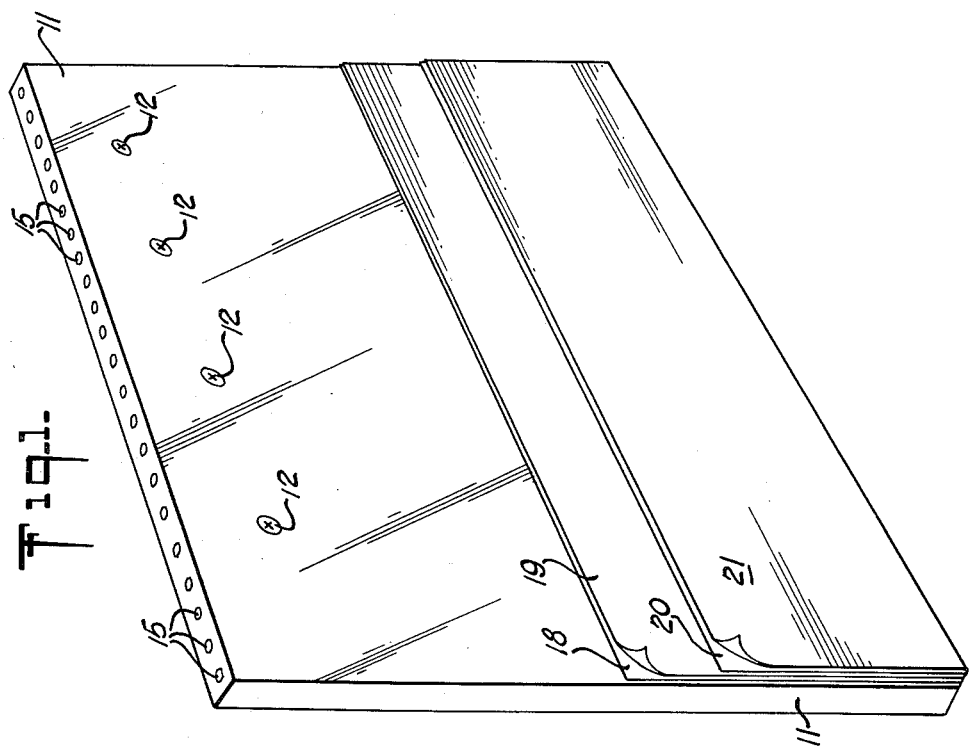

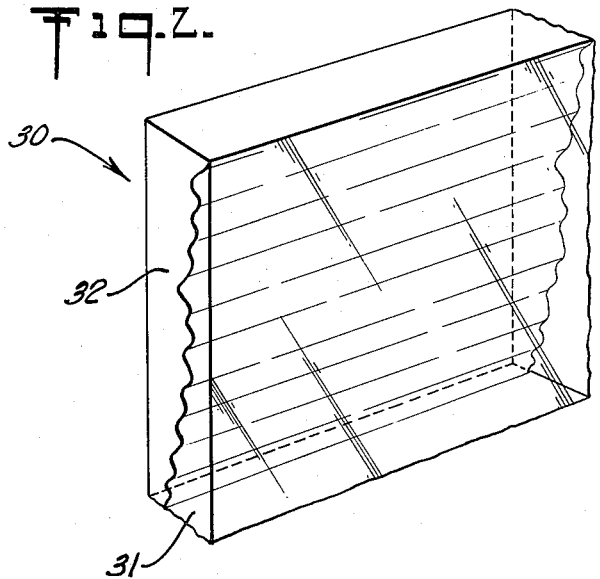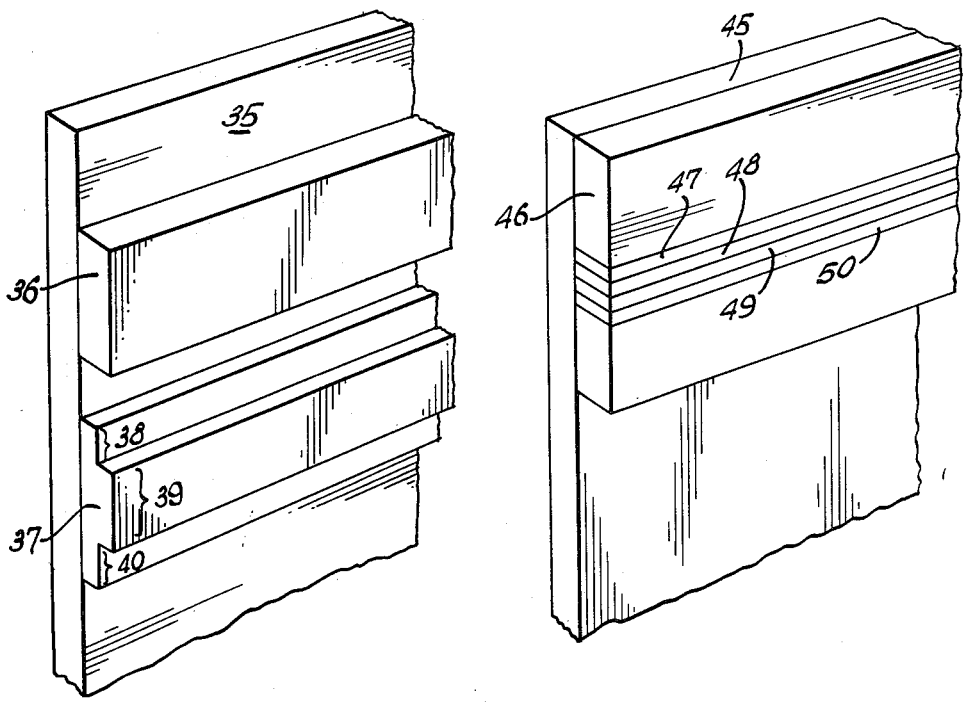

3,047,965
SEISMIC MODEL METHOD AND APPARATUS
Hugh O. Walker, Jr., Houston, Tex., Frank Press, Altadena, Calif., and Burton D. Lee, Houston, Tex., assignors to Texaco Inc., New York, N.Y., a corporation of Delaware
Filed Oct. 14, 1960, Ser. No. 62,714
7 Claims. (Cl. 35—10)

This invention is concerned with seismic exploration generally. More specifically it is particularly applicable to and concerned with model seismic exploration work, i.e. so-called two dimensional seismic models and methods applicable thereto. The invention is especially adapted for use in two dimensional seismic models as to the construction thereof for enabling a model to be constructed with characteristics that more closely simulate those actually encountered in seismic exploration work (full scale). For example, in actual seismic exploration operations employing reflection as well as refraction shooting, some of the effects created are caused by reason of seismic velocity variation in the earth's crust which velocities and variation thereof change in various ways as the depth of the formation increases.

Thus, it is an object of this invention to provide an improved thin sheet seismic model having continuously varying velocity over a longitudinal dimension thereof that represents the vertical dimension of the earth's crust.

Another object of the invention is to provide an improved thin sheet seismic model by employing the expedient of bonding added layers in the thickness dimension but not extending over a full longitudinal dimension, onto a basic sheet of any given material. These layers comprise one or more materials having seismic velocities different from the basic sheet of material.

Still another object of this invention is to provide an improved apparatus for use in thin sheet seismic model work, in addition to teaching an improved method in connection therewith. The structure of such thin sheet seismic model includes one where an added layer of different seismic velocity material is bonded to a principal layer that makes up the basic shape of the thin sheet model, and where the added layer or layers comprise a number of transverse layers forming laminations with the principal layer but not extending fully over one of the two longitudinal dimensions thereof, which are constructed so as to simulate subsurface strata of various thicknesses representing some predetermined cross section of the earth's crust.

Briefly, the invention may be described as a thin sheet model for use in seismic laboratory investigations and the like. Such model comprises a sheet of material having in contact therewith at least one seismic energy transducer. The said sheet includes a plurality of additional materials across the thickness thereof but not extending completely over one of the longitudinal dimensions of said sheet, while each of said materials have a different seismic velocity characteristic.

Again briefly, the invention may be described as one that is applicable to model seismic investigations employing a thin sheet model to represent a cross section of the earth's surface. The invention comprises the method of providing variations in seismic velocities over predetermined dimensions of the model. The steps of this method comprise those of casting a sheet of material having a predetermined seismic velocity onto the surface of another sheet of material having varying thickness and having different predetermined seismic velocity.

The foregoing and other objects and benefits of the invention will be appreciated and made additionally clear in connection with particular embodiments thereof that are set forth below, and illustrated in the drawings, in which:

FIGURE 1 is a perspective view with the thickness dimensions exaggerated, showing a model in accordance with the invention;

FIGURE 2 is an enlarged fragmentary perspective showing, with the thickness dimension greatly exaggerated, illustrating another embodiment of the invention;

FIGURE 3 is another enlarged fragmentary perspective view illustrating still another embodiment of the invention; and FIGURE 4 is yet another enlarged fragmentary perspective view illustrating still another embodiment of the invention.

As has been indicated above, this invention concerns so called two dimensional seismic models. These are employed in laboratory-type investigations for studying various simulated subsurface conditions, in order to advance the art of interpretation and the ability to obtain better records in seismic exploration generally. Such a so called two dimensional model is, of course, not actually only two dimensional; but it is constructed of a relatively thin sheet of material so as to provide a working representation of a cross section of the earth's crust. In connection with such a sheet of material, miniature seismic transducers are employed to simulate the geophones that are used in full scale seismic exploration work. By employing such miniature transducers and making use of high frequency energies, the model is made to represent a cross section of the earth's crust which is in effect accurate at a reduced scale with relation to the cross section that it represents.

This model seismic technique is well known to those skilled in the art, and reference may be had to a technical paper which was presented by one of the applicants to the Society of Exploration Geophysicists at a meeting held near the end of October 1956 in New Orleans, La. For the purposes of this disclosure it is adequate to understand that transducers are attached to the model sheet in any feasible manner, with one transducer employed at intervals to represent the "shot point" while a plurality of additional transducers are attached along the top edge of the sheet to represent the geophones on the surface of the earth.

Referring to FIGURE 1, the foregoing general explanation will be clarified by noting that there is shown a sheet 11 of material which may be any desired material having the seismic energy velocity characteristics according to a given model representation. Consequently it is usual to employ a material having relatively low seismic velocity characteristics, e.g. a plastic material such as that commonly known by the trademark Plexiglas may be employed. Thus, the top part of the sheet 11 will represent the lowest velocity portion of the model and this is in accordance with the usual earth's cross section situation.

Embedded in the sheet 11, at intervals along the horizontal dimension and below the top edge thereof to simulate shot points in a reflection survey, there are a plurality of transducers 12 that are schematically illustrated by the symbol of an X within a circle that might be a drilled hole for embedding each transducer therein. In addition, there are shown a greater number of schematically illustrated transducers 15, which are illustrated schematically by circles along the top edge of the sheet 11. The transducers 15 are those which represent the geophones that would be employed in a full scale seismic reflection type exploration operation. The schematic representation of transducers 12 and 15 is similar to the showing which was made in U.S. Patent No. 2,885,023 and the explanation there made will help to indicate the manner of use of these transducers in model seismic work.

It has been discovered that where a sheet of material having a given seismic velocity characteristic, has firmly bonded thereto another sheet of a different material (which has some other seismic velocity characteristic) the resulting two sheets creates an effect, insofar as a seismic wave energy traveling longitudinally through the two sheets together is concerned, as if the combined layers were one material having a velocity characteristic between that of each of the two layers or sheets of different material. Furthermore, it has been discovered that where such multi-layer structure is employed, reflections of seismic energy occur at the boundary(s) of the bonded sheet with respect to the remaining portion of a larger, or principal sheet to which the bonded sheet is attached. As a corollary discovery, it has been noted that the seismic velocity of a sheet of two materials having different velocities may be made to display a velocity anywhere in between the two velocities of the separate materials by varying the relative thickness of the two materials.

As an illustration of the foregoing, reference may be had to FIGURE 1 again. There is shown the principal sheet 11 of relatively low seismic velocity material, e.g. a plastic, which has securely bonded thereto two thin sheets 18 and 19 that are composed of a higher velocity seismic material, e.g. aluminum. With the edges spaced vertically below sheets 18 and 19, there are two additional sheets 20 and 21 which are bonded on top of sheets 18 and 19 and also continue all the way to the bottom of the principal sheet 11. The lower sheets 20 and 21 may also be aluminum, and the resulting model structure will provide a cross section representation that has seismic velocity which is relatively low for the upper portion of sheet 11 down to where the aluminum sheets 18 and 19 are bonded thereto. Then, traveling vertically downward on the total layered sheet, the seismic velocity becomes greater below the upper edge of sheets 18 and 19. The increase is to an intermediate value between the velocity of aluminum and the velocity of the plastic sheet 11, and the value of this velocity is dependent upon the thicknesses of the sheets which go to make up the total thickness at any given point. Consequently the resulting velocity below the upper edge of sheets 18 and 19 remains at a new value until the upper edge of sheets 20 and 21 are reached. Then the velocity increases once more to another higher velocity value since the seismic velocity becomes more nearly that of the aluminum alone, by reason of the added thickness of aluminum sheets. It is to be noted that once more seismic energy reflections will be had from the line formed by the upper edge of sheets 20 and 21. The model thus represents a cross section of the earth's crust, and the edges of sheets 18, 19 and 20, 21 are comparable to changes in subsurface strata where the seismic velocity increases and where a reflection of seismic energy will be had at each such velocity change.

Referring to FIGURES 2, 3 and 4, it will be observed that various different embodiments of the invention may be had, whereby conditions of gradual velocity change or layers of higher and lower velocities, etc. may be simulated by various arrangements in the model construction.

Thus, another manner of constructing a model which may be somewhat simpler in mechanical construction thereof, than a prior art arrangement, is one which also may provide a more closely realistic simulation of actual subsurface conditions. As illustrated in FIGURE 2, a composite sheet 30 (a small fragment shown enlarged) is made up of a rough surfaced, varying thickness sheet of high velocity material 31 which has cast on to the rough surface thereof a plastic material 32 which latter has a relatively low seismic velocity. By means of this structure, complex variations of velocity in the subsurface may be accurately simulated.

Referring to FIGURE 3 it will be observed that conditions of multi-layered strata where the seismic velocities are higher and lower alternately, may be simulated by bonding strips of higher velocity material of different thicknesses on to one face of a plastic sheet. Thus a sheet 35 (a small fragment shown enlarged) may be plastic or some low velocity material, while a strip 36 of metal or some high velocity material is bonded on one face of the sheet 35 so as to provide for simulation of a stratum having the vertical thickness represented by the vertical dimension of strip 36. Spaced a distance below the strip 36 there is another strip 37 which may be the same material as strip 36 but which is provided with at least two separate thicknesses so that there is an upper edge 38 on strip 37 which has a thickness that is less than the thickest portion of strip 37. Also, below a central portion 39 of the strip 37 there may be a lower edge 40 which may have the same or a different thickness from the upper edge 38 of strip 37. In this manner the model constructed in accordance with the FIGURE 3 embodiment, would have a given velocity from the upper edge of the principal sheet 35 down to the top edge of strip 36 and then the velocity would increase to an intermediate value between that of the material of sheet 35 and that of the material of strip 36 for the vertical distance covered by the width of the strip 36. Then moving vertically down below this point, the velocity would again drop back to that of the sheet 35 until the upper edge of strip 37 is reached. At this point the velocity would jump up once more; but assuming that strip 37 is the same material as strip 36, it would not go as high as it did at the strip 36 since the upper edge 38 of the strip 37 is not as thick as the strip 36 is. Then, continuing down vertically along the whole sheet 35, the velocity would jump up once more as the central portion 39 of strip 37 is reached, followed by a reduction again as you go opposite the lower edge 40 of strip 37.

It will be observed that by making use of different materials and different arrangements of bonded sheets or strips, the total composite sheet employed in the model may be created to simulate almost any desired subsurface conditions.

Referring to FIGURE 4, it will be observed that one further arrangement of structure for a composite model sheet is illustrated. Thus, a basic sheet 45 (a small fragment shown enlarged) may have bonded thereto an additional sheet of different velocity characteristic material 46. The added sheet 46 is made up of transverse sandwich-type layers 47—50 and these transverse layers may each have a different velocity characteristic so as to provide the effect on the total composite sheet 45 of various predetermined thin layered velocity changes as the seismic energy travels vertically through the composite sheet (sheets 45 and 46 together).

It will be observed that by employing the conception of this invention, a two dimensional seismic model may be constructed with ease and have dimensions such that a laboratory size model can be easily constructed. In addition, the model may be set up to simulate almost any conceivable subsurface condition, and thus a laboratory investigation may be carried out to determine optimum procedures in advance of the actual seismic exploration operation. In this manner, much may be done to avoid unproductive results when operating a full scale seismic crew in the field.

In constructing the various modifications of this invention any feasible technique may be employed. However it has been found that a good adhesive for securely bonding the sheets and strips together should be employed. Thus, it has been found that a satisfactory adhesive for bonding aluminum and a plastic like that commonly known by its trademark, i.e. Plexiglas, is one manufactured by H. B. Fuller Co. and designated Resiweld Adhesive No. 1. Furthermore, where the sheets are formed by casting a plastic onto a sheet of higher velocity material, e.g. aluminum, a satisfactory plastic material has been found to be an epoxy resin, e.g. one manufactured by Shell Chemical Corp. and designated Epon Adhesive VI.

What is claimed as the invention is:

1. A thin sheet model for use in seismic laboratory investigations and the like comprising a sheet of material having in contact therewith at least one seismic energy transducer, said sheet including a plurality of materials across the thickness thereof but extending only partially over one of the longitudinal dimensions of said sheet, each of said materials having a different seismic velocity characteristic.

2. A thin sheet model for use in seismic laboratory investigations and the like comprising a sheet of material having in contact therewith at least one seismic energy transducer, said sheet including layers of different materials on at least part of the area thereof and not extending completely over one of the longitudinal dimensions of said sheet, each of said materials having a different seismic velocity characteristic.

3. A thin sheet model for use in seismic laboratory investigations and the like comprising a sheet of material having in contact therewith at least one seismic energy transducer, said sheet including layers of different materials on at least part of the area thereof and not extending completely over one of the longitudinal dimensions of said sheet, said layers varying in thickness, each of said materials having a different seismic velocity characteristic.

4. A thin sheet model for use in seismic laboratory investigations and the like comprising a sheet of material having in contact therewith at least one seismic energy transducer, said sheet including layers of different materials on at least part of the area thereof, one of said layers comprising a second sheet of material having an area less than the area of said first named sheet, said second sheet being bonded securely to said first sheet, each of said sheets of material having a different seismic velocity characteristic.

5. A thin sheet model for use in seismic laboratory investigations and the like comprising a sheet of material having in contact therewith at least one seismic energy transducer, said sheet including layers of different materials on at least part of the area thereof, one of said layers comprising a second sheet of material having an area less than the area of said first named sheet, said second sheet being bonded securely to said first sheet, said second sheet having varying thickness over the area thereof, each of said sheets of material having a different seismic velocity characteristic.

6. A thin sheet model for use in seismic laboratory investigations and the like comprising a sheet of material having in contact therewith at least one seismic energy transducer, said sheet including layers of different materials on at least part of the area thereof, one of said layers comprising a second sheet of material having an area less than the area of said first named sheet, said second sheet being bonded securely to said first sheet, said second sheet comprising a plurality of different seismic velocity characteristic materials in transverse layers therethrough.

7. In seismic model investigations employing a thin sheet model having a thickness that is small compared to the two longitudinal dimensions thereof, the combination comprising a sheet of material having across the thickness dimension thereof over an area less than the total area of said model a plurality of materials, said materials having different seismic velocities whereby the longitudinal seismic velocity for the model at any location thereon is a weighted average of the velocities of said plurality of materials.

References Cited in the file of this patent

UNITED STATES PATENTS

| | | |
|---|---|---|
| 2,321,450 | Athy | June 8, 1943 |
| 2,834,422 | Angona | May 13, 1958 |
| 2,885,023 | Walker | May 5, 1959 |
| 2,886,795 | Thatcher | May 12, 1959 |